United States Patent [19]
Ito et al.

[11] Patent Number: 5,794,124
[45] Date of Patent: Aug. 11, 1998

[54] TIME DIVERSITY COMMUNICATIONS SYSTEM

[75] Inventors: Shogo Ito, Yokohama; Yasushi Yamao, Yokosuka; Shinzo Ohkubo, Tokorozawa, all of Japan

[73] Assignee: NTT Mobile Communications Network Inc., Tokyo, Japan

[21] Appl. No.: 558,136

[22] Filed: Nov. 13, 1995

[30] Foreign Application Priority Data

Mar. 11, 1994 [JP] Japan .................... 6-041299

[51] Int. Cl.[6] .................. H04L 1/02; H04B 7/02
[52] U.S. Cl. ............... 455/38.3; 455/101; 340/825.44; 371/69.1
[58] Field of Search .............. 455/343, 60, 54.1, 455/38.3, 38.1, 69, 101; 340/825.44, 825.47; 371/70, 69.1

[56] References Cited

U.S. PATENT DOCUMENTS

| | | | |
|---|---|---|---|
| 4,759,022 | 7/1988 | Akerberg | 371/69.1 |
| 5,175,874 | 12/1992 | Auchter | 455/343 |
| 5,396,660 | 3/1995 | Cannon | 455/343 |
| 5,436,906 | 7/1995 | Kasuya et al. | 455/69 |
| 5,493,282 | 2/1996 | Petreye et al. | 340/825.44 |

FOREIGN PATENT DOCUMENTS

| | | |
|---|---|---|
| 61-270935 | 12/1986 | Japan . |
| 5-36963 | 1/1987 | Japan . |
| 63-290026 | 11/1988 | Japan . |
| 1-181250 | 7/1989 | Japan . |
| 4-341020 | 11/1992 | Japan . |

*Primary Examiner*—Reinhard J. Eisenzopf
*Assistant Examiner*—Lester G. Kincaid
*Attorney, Agent, or Firm*—Cushman Darby & Cushman IP Group of Pillsbury Madison & Sutro LLP

[57] ABSTRACT

A system wherein time diversity reception is performed for each error-corrected or error-detected code word without distinguishing between the address signal and the message signal, the code words being the units which make up the address and message signals. A received signal comprising correctly decoded code words is obtained by selecting code words that are judged to have been correctly decoded in accordance with error detecting/correcting logic from among code words with the same content that have been received a plurality of times. When a code word has been correctly decoded, part of the selective radio paging receiver is inhibited from working during the time intervals when correctly received code words would be received, thereby decreasing battery consumption.

6 Claims, 13 Drawing Sheets

| FIG.2A | | | | | | | | |
|---|---|---|---|---|---|---|---|---|
| 1-1 | 1-2 | 1-3 | 1-4 | 1-5 | 1-6 | 1-7 | 1-8 | |
| × | × | ○ | ○ | ○ | × | ○ | × | |

| FIG.2B | | | | | | | | |
|---|---|---|---|---|---|---|---|---|
| 2-1 | 2-2 | 2-3 | 2-4 | 2-5 | 2-6 | 2-7 | 2-8 | |
| ○ | ○ | ○ | × | × | × | ○ | ○ | |

| FIG.2C | | | | | | | | |
|---|---|---|---|---|---|---|---|---|
| 2-1 | 2-2 | 1-3 | 1-4 | 1-5 | 1-6 | 1-7 | 2-8 | |
| ○ | ○ | ○ | ○ | ○ | × | ○ | ○ | |

| | | | | | | | |
|---|---|---|---|---|---|---|---|
| 1-1 | 1-2 | 1-3 | 1-4 | 1-5 | 1-6 | 1-7 | 1-8 |
| × | × | 2 | 0 | 1 | × | 2 | × |

FIG.3A

| | | | | | | | |
|---|---|---|---|---|---|---|---|
| 2-1 | 2-2 | 2-3 | 2-4 | 2-5 | 2-6 | 2-7 | 2-8 |
| 2 | 1 | 0 | × | × | × | 1 | 2 |

FIG.3B

| | | | | | | | |
|---|---|---|---|---|---|---|---|
| 2-1 | 2-2 | 2-3 | 1-4 | 1-5 | 1-6 | 2-7 | 2-8 |
| 2 | 1 | 0 | 0 | 1 | × | 1 | 2 |

FIG.3C 5,794,124

TIME DIVERSITY COMMUNICATIONS SYSTEM

BACKGROUND OF THE INVENTION

1. Field of the Invention

This invention is utilized in mobile radio communications systems, and relates to the use of time diversity techniques. In particular, the present invention relates to time diversity techniques in which a radio base station repeatedly transmits the same signal comprising an error detecting code or error correcting code, until the receiver is able to decode this signal correctly. This invention is applicable to selective radio paging systems, and relates in particular to techniques for increasing the probability of correctly receiving a transmitted signal even under poor channel conditions.

2. Description of the Art

A selective radio paging system employs receivers that receive the same signal transmitted a plurality of times. In a selective radio paging system, the same signal is transmitted a plurality of times, and when a selective radio paging receiver receives any of these identical signals, if its own address is contained in the received signal, it confirms that a call has been made to itself and emits a ringing tone and displays a message. The signal comprises code words of error correcting code or error detecting code. The principles of this prior art will be explained with reference to FIGS. 9A–9B and FIG. 10. FIGS. 9A–9B shows code words that are transmitted repeatedly. In order to make the configuration of an actual paging signal sequence easier to understand, its is shown conceptually. FIG. 10 is a flowchart showing a conventional receiving procedure. A signal is transmitted repeatedly n times as shown in FIG. 9A, and in each repeated signal there are k code words as shown in FIG. 9B. The information content is identical each of the n times.

As shown in FIG. 10, a conventional receiving procedure is as follows: when the number of receptions does not exceed n (S21), it is decided whether or not all the k code words in one signal have been correctly decoded (S22). If this has been impossible, receiving is repeated until the number of receptions equals n. If, as a result of this repeated receiving, all the k code words in one signal can be correctly decoded, one signal is deemed to have been decoded (S23) and the receiving procedure is terminated. If, despite repeating the receiving n times, it turns out to be impossible to decode all the k code words in one signal correctly, it is deemed to have been impossible to decode a signal and receiving is abandoned (S24), whereupon the receiving procedure is terminated. According to a proposal made in Jap. Pat. Appl. No. 5-036963 filed by the present applicant (not yet published as a Kokai patent at the date of filing of the present application), as soon as decoding in a selective radio paging receiver (hereinafter, referred to simply as a "pager") has been successfully completed before the predetermined number n of repetitions has reached, battery consumption can be reduced by prohibiting reception, and thereby stopping part of the pager from working, until the predetermined arrival time of the next different paging signal, which is also repeated n times.

The problem with a prior art receiving method of this sort is that in a poor quality mobile radio channel subject to fading, the probability of being able to correctly decode all the k code words in one signal is low, which means that there is a low probability of receiving a paging signal correctly. Accordingly, a receiving method that uses a time diversity reception scheme has been disclosed in Jap. Kokai Pat. No. 63-290026. This time diversity reception scheme will be explained with reference to FIGS. 11A–13. FIGS. 11A–11C shows a paging signal sequence; FIG. 12 is a block diagram of a prior art device; and FIG. 13 is a flowchart showing the procedure employed in a prior art time diversity reception scheme. The paging signal sequence shown in FIG. 11A comprises frames of length T, each frame comprising r subframes connected together. Each subframe signal comprises a plurality of paging signals: for example, subframe j comprises mj paging signals as shown in FIG. 11B. Each paging signal comprises an address signal consisting of p code words of error correcting code, and a message signal consisting of q code words of error correcting code. See FIG. 11C. The pagers are divided into r groups, and a pager belonging to group j enters the receiving mode only during the receiving time for the single subframe j. During this time interval, when the address signal of a paging signal in that subframe matches the address number of a pager, that pager carries out paging: namely, it emits a ringing tone and displays the message signal following this address signal on its display.

Time diversity reception processing is carried out in this selective radio paging system in order to increase the probability of receiving a paging signal correctly. Namely, when a paging signal is transmitted a plurality of times, a comparison is made with respect to the code words that comprise the message signal, between (a) the error detection decoding result for each code word of the message signal received by retransmission, and (b) the error detection decoding result for each code word in the case of the message signal received up to and including the previous time, said result having been stored in memory. As a result of this comparison, correctly decoded code words are selected and combined.

In the pager illustrated in FIG. 12, the signal received by antenna 1 is input to receiving part 2 and after being demodulated, is input to decoder 3. Error correction or error detection is carried out on each code word by means of decoding circuit 4 in this decoder 3. The output of decoding circuit 4 is supplied to address signal detection circuit 10, and when the address signal of the pager is detected, the processing procedure illustrated in FIG. 13 is executed in processor circuit 5.

When the number of receptions does not exceed n (S31), it is decided whether or not the address signal detected by address signal detection circuit 10 has been correctly decoded, and whether or not this address signal matches the address number of the pager in question (S32). If it does match the page address, this fact is communicated to processor circuit 5. For each code word of the message signal, processor circuit 5 compares the result of error detection decoding of the code word received the present time with the result of error detection decoding of the code word received the previous time, which is stored in memory 6 (S33), and selects and combines correctly decoded code words (S34). The error detection decoding result for each code word in the message signal after this selecting and combining is also stored in memory 6 together with the message signal after the selected code words have been combined (S35), and it is decided whether or not all the code words in one paging signal have been correctly decoded (S36). If the address signal cannot be correctly decoded, the pager is held on stand-by until the time for reception of the next retransmitted paging signal. If all the code words in one paging signal have been correctly decoded, reception of the paging signal is deemed to have been successful (S37), whereupon a signal for implementing paging operations is output to driver 7, the paging operations being the emission of a ringing tone from speaker 9 and the display of the message signal on display 8. When there are one or more incorrectly decoded code words among the q code words comprising the message signal, this processing is repeated in the next signal reception period. If the number of receptions reaches n+1, this paging signal is abandoned as one that cannot be correctly decoded and is deemed not to have been received (S38).

This time diversity reception scheme is an excellent method, capable of correctly decoding message signals even in poor quality mobile radio channels. However, it will perform time diversity processing only when the address signal has been correctly decoded at each retransmission and it has been recognized that the same message signal is being transmitted to the same address. Because the probability of receiving an address signal correctly in a poor quality mobile radio channel is low, time diversity processing will sometimes be impossible, which means that it will sometimes be impossible to increase the probability of receiving a paging signal correctly. As mentioned above, according to the proposal made in Jap. Pat. Appl. No. 5-036963 filed by the present applicant (not yet published as a Kokai patent at the date of filing of the present application), when decoding has been successful, part of the pager can be inhibited from working until the following n receptions by prohibiting reception at times when a transmitted code word could be expected to be received. However, if there is a low probability of receiving a paging signal correctly, this battery saving operation will hardly be applicable.

SUMMARY OF THE INVENTION

The present invention has been devised in the light of this situation, and has an object to provide a time diversity communications system which can further improve the probability of correct reception by a receiving device. It is a further object of this invention to provide a time diversity communications system which, when applied to a selective radio paging system, gives a pager whereby the probability of receiving correctly can be further improved. It is yet another object of this invention to provide a time diversity communications system which gives a pager with reduced battery consumption.

The distinguishing feature of this invention is that the address signal and the message signal each comprises a plurality of code words, and time diversity reception is performed for all the code words comprising a paging signal without distinguishing between the address signal and the message signal. In other words, according to a first aspect, this invention is a time diversity communications system, the distinguishing feature of which is that it has: a transmitting device which, as time elapses, transmits code words with the same content repeated a plurality of times as radio signals, the code words having been encoded in accordance with an error correcting or error detecting logic; and a receiving device which receives the aforementioned code words and decodes them in accordance with the error correcting or error detecting logic; this receiving device selects, from among code words with the same content that have been received over a plurality of times, those code words that are judged to have been correctly decoded in accordance with the error correcting or error detecting logic. The above-described device makes it possible to perform time diversity reception wherein, from among code words with the same content that have been received over a plurality of times, code words without error are selected, so that the probability of receiving correctly can be improved.

The aforementioned selecting means should select, from among code words with the same content that have been received over a plurality of times, and from among code words that are judged to have been correctly decoded in accordance with the aforementioned error correcting logic, those code words with the smallest number of error-corrected bits. This makes it possible to select, from among corrected code words with the same content that have been received over a plurality of times, those code words which have the least likelihood of miscorrection.

The aforementioned receiving device also prohibits the reception of subsequent code words with the same content when, from among code words with the same content that have been received over a plurality of times, code words that are judged to have been correctly decoded in accordance with error correcting or error detecting logic have been obtained. Thus, once a code word has been correctly decoded, by prohibiting reception during the time when subsequently transmitted code words with the same content would be received, part of the pager can be inhibited from working. As a result, battery consumption can be decreased. The aforementioned code word can be part of the address signal or part of the message signal.

The radio signal that is transmitted from the aforementioned transmitting device comprises frames which are transmitted repeatedly n times, each frame containing a plurality of subframes. Each subframe contains a plurality of paging signals, and each paging signal contains an address signal and a message signal. The address signal and the message signal both contain a plurality of code words. The aforementioned receiving device can be used as a pager which receives this radio signal and detects when an address signal matches the address which has been set in itself.

Alternatively, the radio signal transmitted from the aforementioned transmitting device can have the following configuration. Namely, it can comprise frames which are transmitted n times, each frame containing a plurality of subframes of equal time length, and each subframe containing n paging signal groups each of which differs in respect of the number of times it has been transmitted. A paging signal group which was transmitted for the nth time in a subframe that was transmitted in the previous transmission period is deleted from the subframe that is transmitted in the present transmission period, and instead, a paging signal group, which is being transmitted for the first time, is inserted in that subframe, the paging signal group containing new paging signals. Each of the plurality of paging signal groups contains a plurality of paging signals, and each paging signal contains an address signal and a message signal. The address signal and the message signal both contain a plurality of code words. The aforementioned receiving device can be used as a pager which receives the aforementioned radio signal and detects when an address signal matches the address which has been set in itself According to a second aspect, the above-described invention is a receiving device or selective radio paging receiver which is used in this time diversity communications system.

The selective radio paging receiver (hereinafter, referred to simply as the "pager") receives a repeatedly transmitted signal. Although this signal is internally divided into address signal regions and message signal regions, both of these regions comprise a collection of code words. This invention is characterised in that the signal is regarded simply as a collection of code words and that time diversity reception is performed on each code word without distinguishing between address signals and message signals.

After a signal that has been transmitted for the first time is received, the code words are decoded without distinguishing between address signal regions and message signal regions. Code words that have been received a plurality of times include not only those that have been decoded correctly, but also those that contain errors. Correctly decoded code words include those that did contain errors, but which have been corrected (e.g., those in which one bit has been corrected, those in which two bits have been corrected, and so on). All these results are stored in memory. This procedure is repeated for the following n transmissions. After the nth reception is finished, if all the code words are correctly decoded, reception is deemed to have been successful.

By selecting, from among correctly decoded code words, those with the smallest number of corrected bits, code words with the least likelihood of miscorrection can be selected.

A code word that has already been correctly decoded on the jth occasion does not have to be received on the (j+1)th and subsequent occasions (where j+1≦n). It follows that battery consumption of the pager can be decreased if some of the functions of the pager pertaining to receiving are stopped during times when correctly decoded code words would be received, and if other code words are received during their (j+1)th and subsequent receptions.

Not until receiving has been successful are the address signals detected and a decision made as to whether or not they include an address signal which matches the address of the pager in question. If an address signal for the pager is included among the address signals, the pager has been paged, and the message signal following the address signal is displayed.

The radio signal transmitted from a base station in its capacity as a transmitting device may for example have the following configuration. Namely, it may comprise frames of period T that are transmitted n times, each frame containing a plural number r of subframes. The jth subframe of a frame (j≦r) contains mj paging signals, and each of these paging signals contains an address signal and a message signal. The address signal contains p code words and the message signal contains q code words. The contents of the paging signals are updated after every time interval nT. A new paging signal will therefore be transmitted after a maximum delay time of nT.

Alternatively, frames may be transmitted n times, each frame containing a plural number r of subframes of time length α, and the jth of these subframes (j≦r) containing n paging signal groups each of which differs in respect of the number of times it has been transmitted. Each of these n paging signal groups contains mj paging signals, and each of these paging signals contains an address signal and a message signal. This address signal contains p code words (p≧1) and this message signal contains q code words (q≧1). The yth paging signal group (1≦y≦n−1) in subframe j transmitted at time t0+(j−1)α, is transmitted as the (y+1)th paging signal group in subframe j transmitted at time t0+T+(j−1)α.

In other words, a paging signal group, which was transmitted for the nth time in the previous transmission period, is deleted in the present transmission period, and instead, a paging signal group which is being transmitted for the first time is inserted, the paging signal group containing new paging signals. A new paging request will therefore be transmitted as paging signals after a maximum delay time of T, which means that the time interval between a caller who wishes to page the user of a pager making his call and the pager actually paging its user can be shortened.

Whichever signal format is employed, the position of the paging signals which a given pager should receive has to be known at the receiving side.

As has been explained above, this invention can further improve the probability of correct reception by a receiving device. This invention can therefore, for example, further improve the probability of correct reception of paging signals in a pager. Consequently, it can provide a pager with low battery consumption.

BRIEF DESCRIPTION OF THE DRAWINGS

FIGS. 2A–2C and 3A–3C explain the principles of the first embodiment;

DETAILED DESCRIPTION OF THE PRESENTLY PREFERRED EMBODIMENTS OF THE INVENTION (First embodiment)

Figure 1:
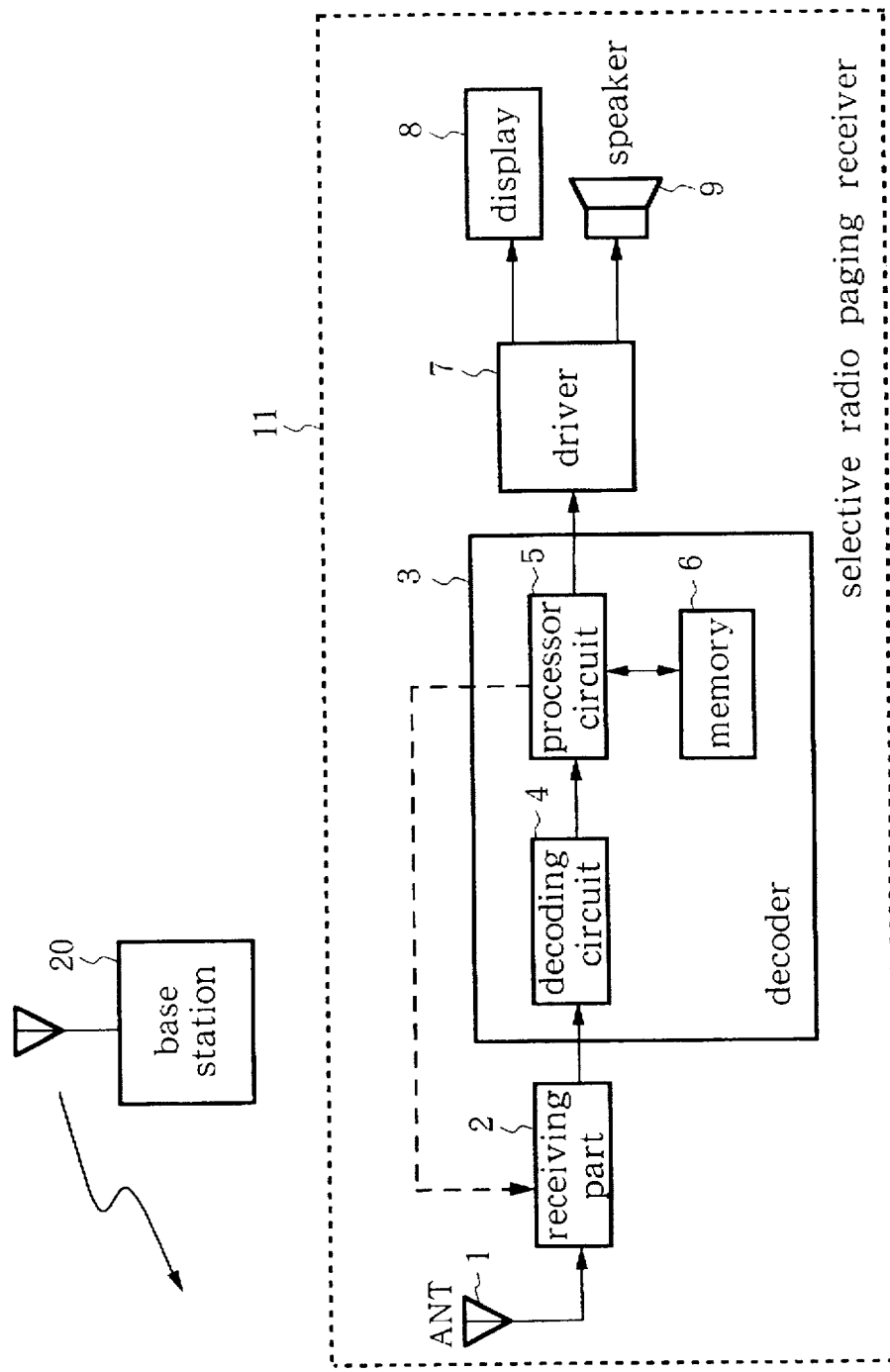
FIG. 1 is a block diagram of a first embodiment of this invention.

The configuration of a first embodiment of this invention will be explained with reference to FIG. 1, which is a block diagram of the first embodiment.

This invention is a time diversity communications system characterised in that it has base station 20 as a transmitting device which, as time elapses, transmits code words having the same content a plurality of times as radio signals, the code words being obtained by encoding an address signal or a message signal in accordance with an error correcting or error detecting logic; and selective radio paging receiver 11 as a receiving device which receives the aforementioned code words and decodes them in accordance with the error correcting or error detecting logic. The selective radio paging receiver 11 includes a decoder 3 which, from among code words with the same content that have been received over a plurality of times, selects as the received information those code words that are judged to have been correctly decoded in accordance with error correcting or error detecting logic.

Decoder 3 in selective radio paging receiver (hereinafter, referred to simply as "pager") 11 also, prohibits the reception of subsequent code words with the same content when the address signal or message signal obtained, which comprises code words with the same content that have been received over a plurality of times, comprises code words which are judged to have been correctly decoded in accordance with error correcting or error detecting logic. This enables part of pager 11 to be inhibited from working, whereby battery consumption can be decreased.

The radio signal transmitted from base station 20 comprises frames that are transmitted n times, each frame containing a plural number r of subframes. The jth subframe of a frame (j≦r) contains mj paging signals, and each of these paging signals contains an address signal and a message signal. The address signal contains p code words and the message signal contains q code words. Pager 11 receives this transmitted signal and when it detects that an address signal matches the address which has been set in itself, it employs speaker 9 and/or display 8 to indicate to the user that a call has been made.

The principles of this first embodiment of the invention will be explained with reference to FIGS. 2A–2C and FIGS. 3A–3C. FIG. 2A shows a signal that is received the first time, while FIG. 2B shows a signal that is received a second time. An "x" indicates a code word in which an error has been detected, while an "o" indicates a correctly decoded code word (including code words where, although an error was detected, the error has been corrected). The signal received for the first time is compared with the signal received a second time, and the correctly decoded code words in these signals are selected and combined. The result of this operation is shown in FIG. 2C. Because code word "1–6" has had an error detected in both the first time and the second time, the combined result also contains an error. It is therefore necessary to receive code word "1–6" at the third and subsequent reception times until it can be correctly decoded.

FIG. 3A shows a signal that is received for the first time, while FIG. 3B shows a signal received a second time. An "x" indicates a code word in which an error has been detected but cannot be corrected, while a code word with the numeral "0", "1" or "2" below it indicates a code word in which an error has been detected and corrected (i.e., a correctly decoded code word), with the numeral showing the number of corrected bits in the indicated code word. A "0" indicates that no correction is required. In FIGS. 2A–2C, time diversity reception is performed on the basis of whether or not a code word has been correctly decoded, whereas in FIGS. 3A–3C, time diversity reception is performed using the number of error-corrected bits in correctly decoded code words as well. The method illustrated in FIGS. 3A–3C is therefore applicable when the signal comprises code words of error correcting code, but is not applicable when the signal comprises code words of error detecting code.

The signal received the first time and the signal received the second time are compared, and the more correctly decoded code words in these are chosen and combined. The result of this operation is shown in FIG. 3C. Because the probability of miscorrection occurring is lower when there are fewer corrected bits, the code word with fewer corrected bits is selected. An error has been detected in code word "1–6" both the first time the second time, but it has been impossible to correct this, and so the combined result will also contain an error. It is therefore necessary to receive code word "1–6" at the third and subsequent reception times until it can be correctly decoded.

Figures 9A, 9B:
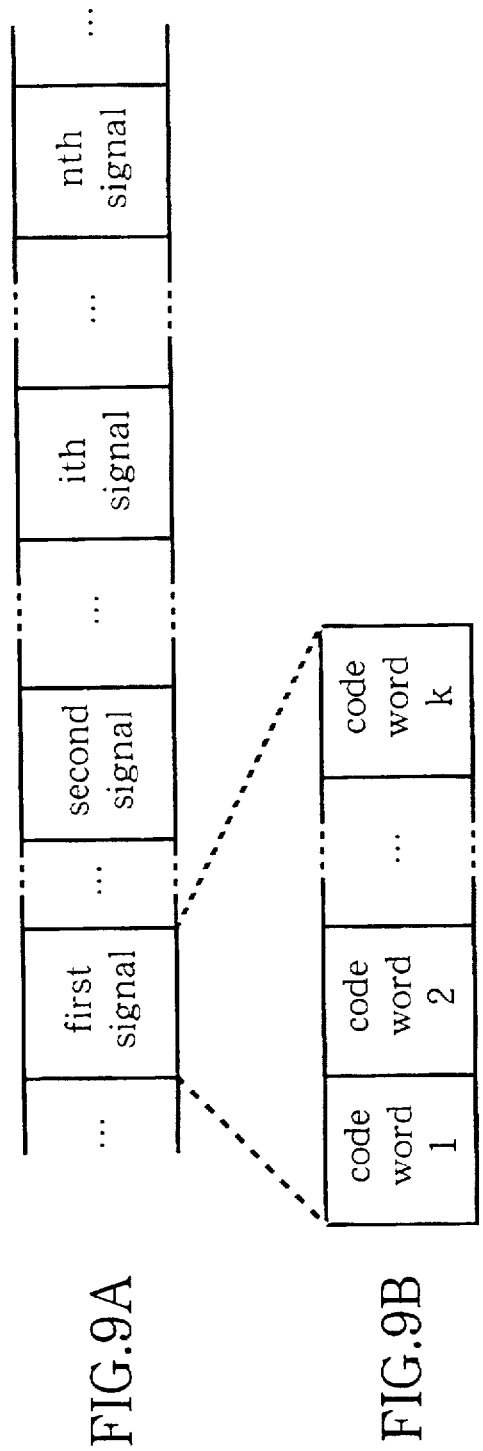
FIGS. 9A–9B illustrate a repeatedly transmitted signal.
Figure 10:
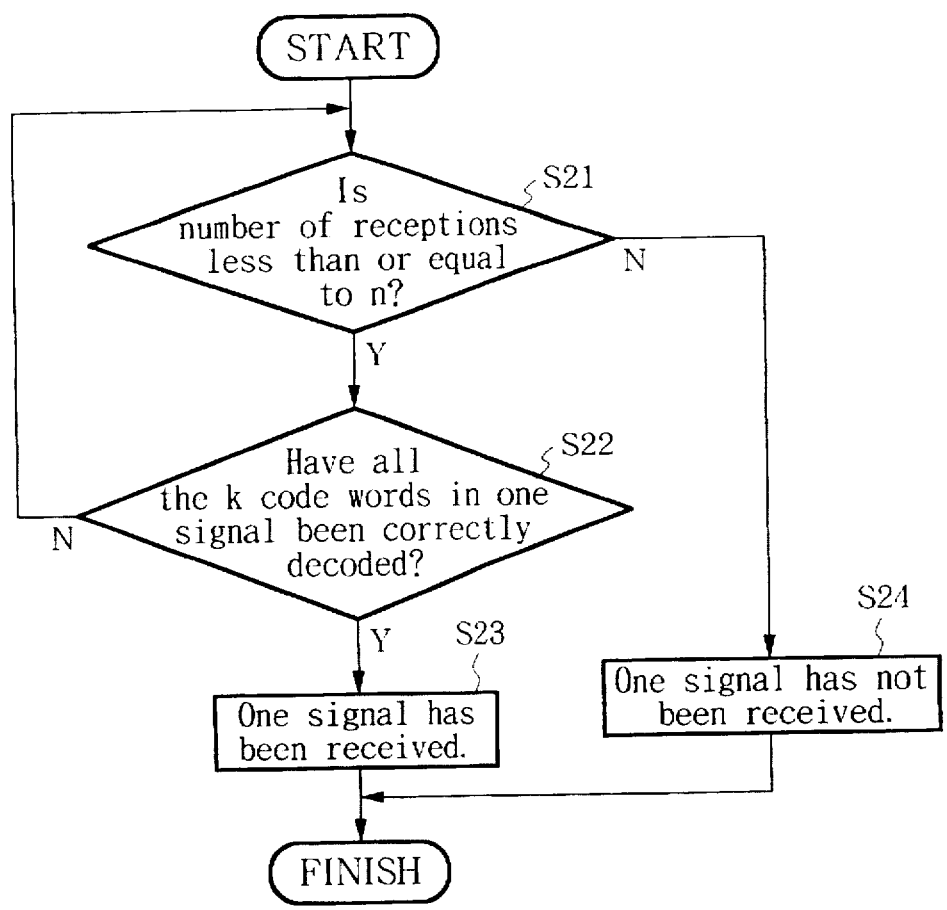
FIG. 10 is a flowchart showing a prior art receiving procedure.
Figure 11A:
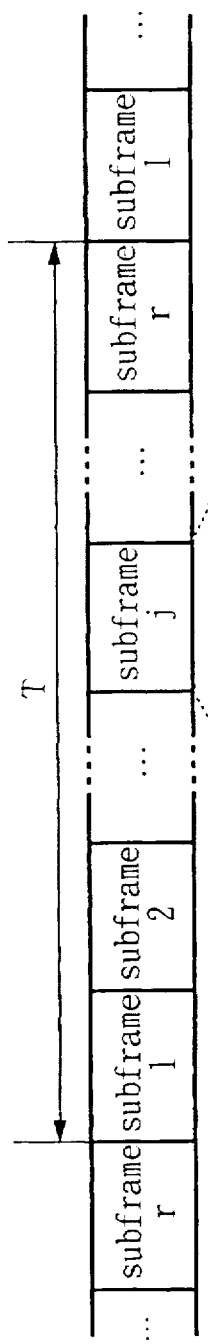
FIGS. 11A–11C illustrate a paging signal sequence.
Figure 11B:
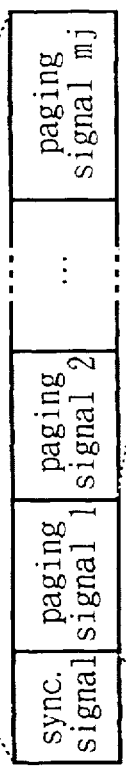
Figure 11C:
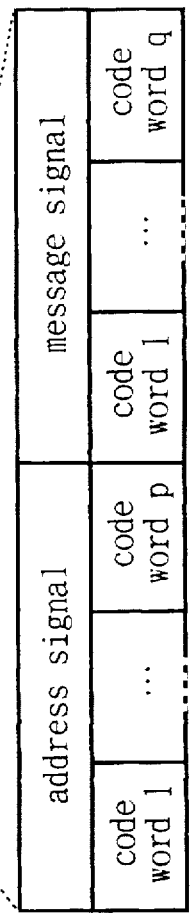
Figure 12:
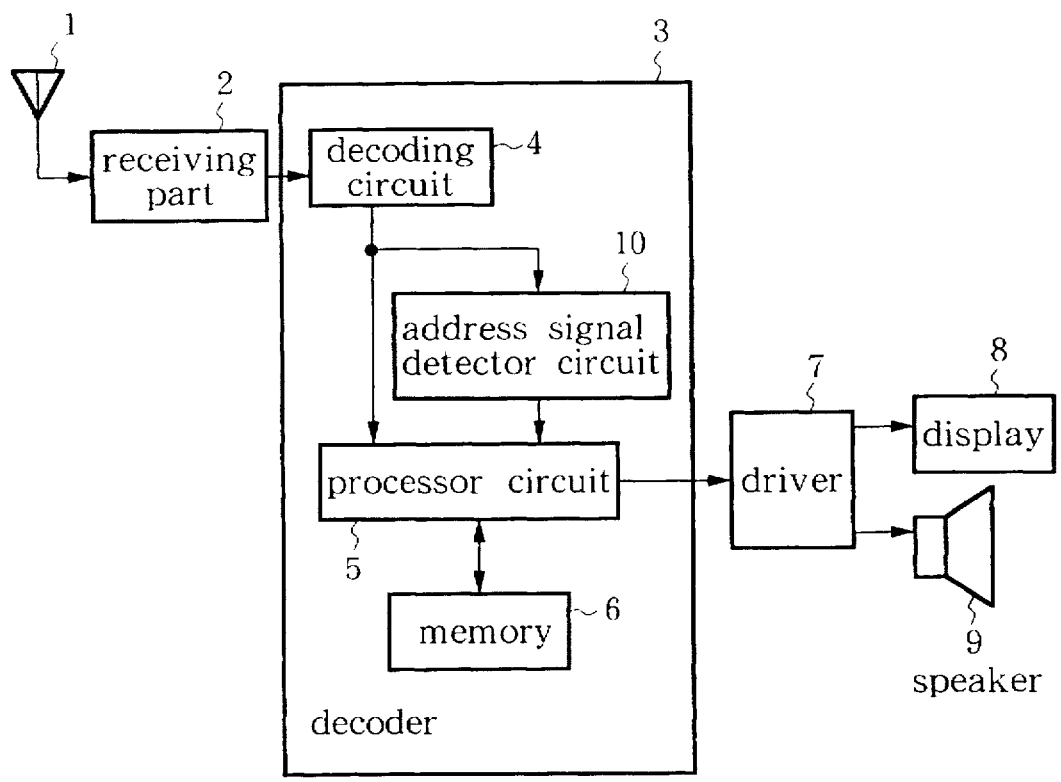
FIG. 12 is a block diagram of a prior art device.
Figure 13:
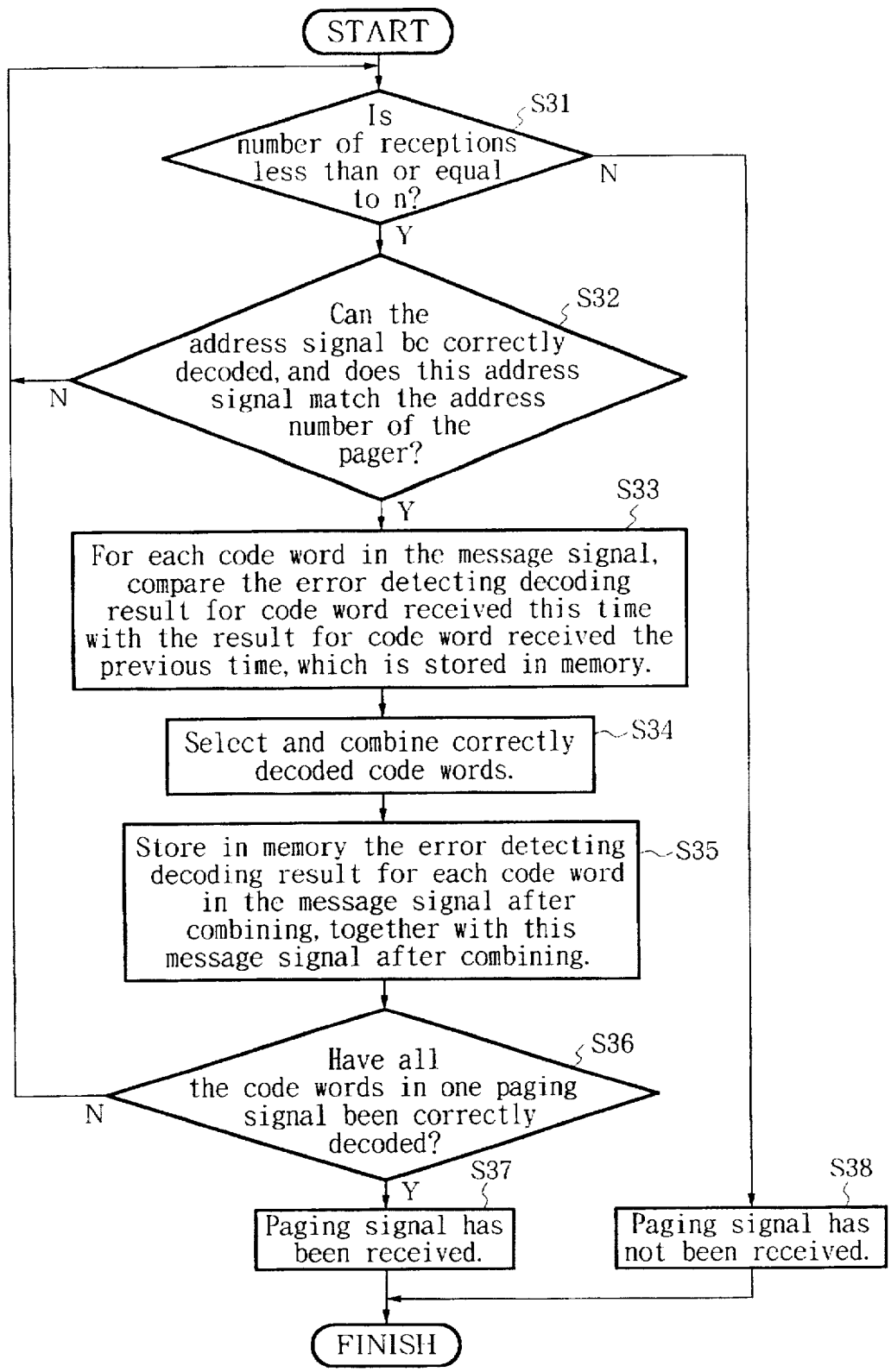
FIG. 13 is a flowchart showing a prior art time diversity reception procedure.

The operation of this first embodiment of the invention will be explained with reference to FIG. 4, which is a flowchart showing the above-described operation. This flowchart shows the operation suited to the repeatedly transmitted signals depicted in FIG. 9 in respect of the prior art. The signal received by antenna 1 shown in FIG. 1 is input to receiving part 2 and the demodulated received signal from this receiving part 2 is input to decoder 3. Error correction or error detection is carried out on each code word by means of decoding circuit 4 of decoder 3. The code words after error correction or error detection are input to processor circuit 5, together with the results of the error correcting or error detecting decoding.

Figure 4:
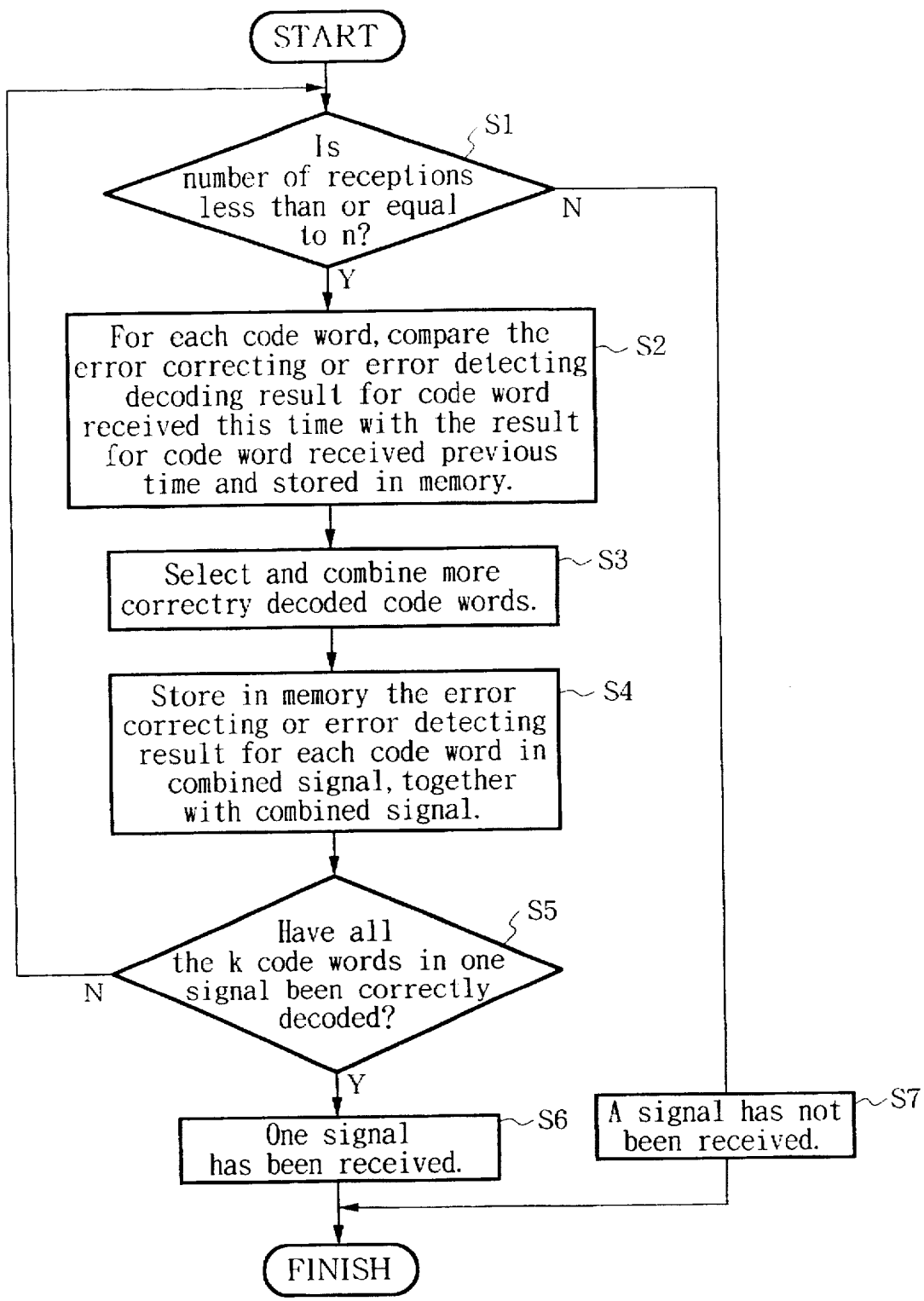
FIG. 4 is a flowchart showing the operation of the first embodiment.

As shown in FIG. 4, in processor circuit 5, when the number of times receiving has been carried out does not exceed n (S1), the result of the error correcting or error detecting decoding of each code word is compared with the corresponding result for each code word stored in memory (S2), and time diversity reception processing is performed, wherein correctly decoded code words are selected and combined (S3). The error correcting or error detecting decoding results for code words after this selecting and combining are stored in memory 6 together with the signal after this combining (S4). Next, when all the k code words in one signal have been decoded without error (S5), reception of one paging signal is deemed to have been successful (S6). The signal after this combining, or its decoded version, is output to driver 7 and processing is terminated. However, if there are one or more incorrectly decoded code words among the k code words, this processing is repeated in the next signal reception period On the other hand, if the number of receptions has reached n+1, receiving of this paging signal is abandoned, the paging signal is deemed not to have been received, and the processing is terminated (S7). Processing may be controlled so that when all the code words in one signal have been correctly decoded, part of pager 11 is inhibited from working until the following n receptions. Alternatively, a finer degree of control may be applied so that part of pager 11 is inhibited from working, in units of correctly decoded code words, until the following n receptions. In this first embodiment of the invention, the operation of receiving part 2 is stopped by a control signal from processor circuit 5.

This first embodiment of the invention is characterised in that time diversity reception is performed on all code words without distinguishing between the address signal and the message signal. In this respect, it differs from the prior art, in which time diversity reception is not carried out if the address signal is not decoded correctly.

Figures 5A, 5B, 5C:
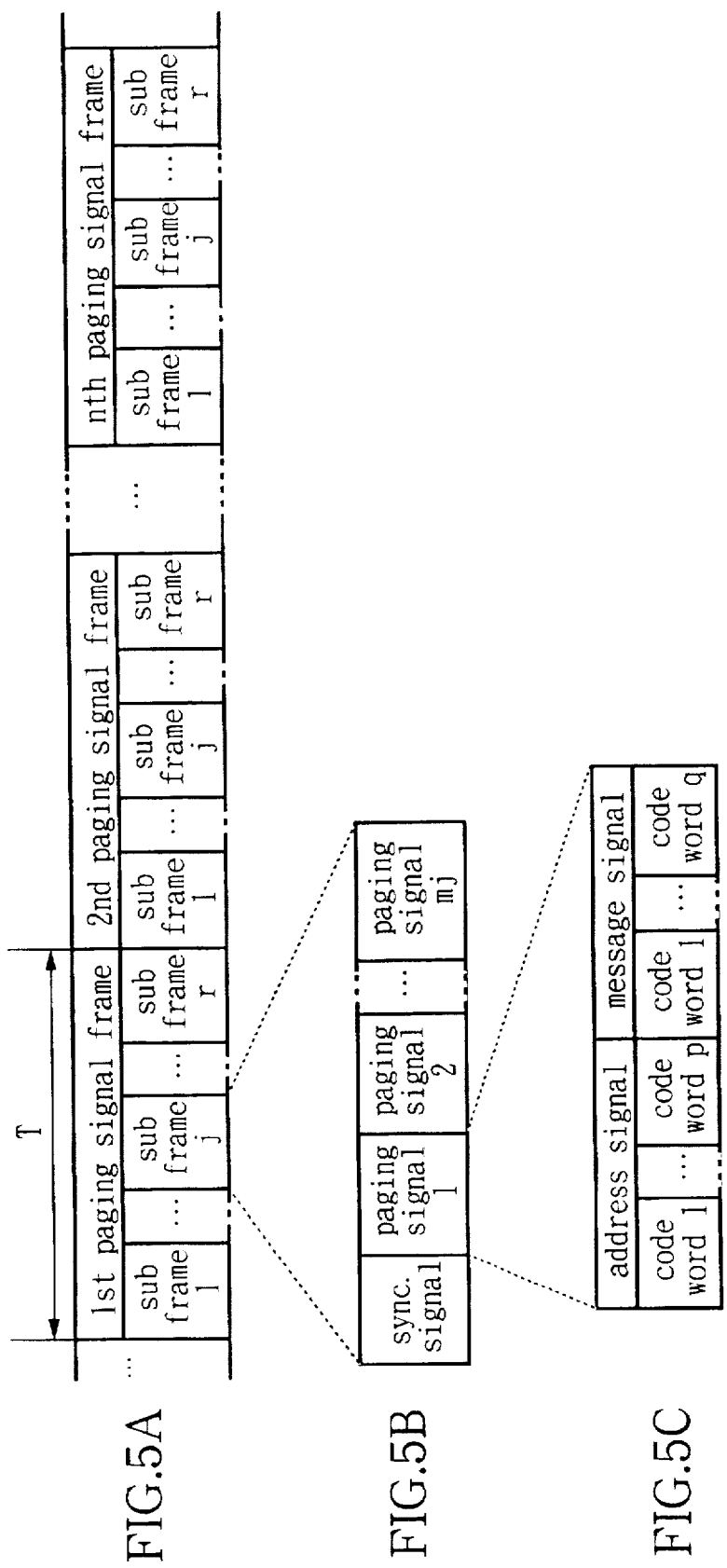
FIGS. 5A–5C illustrate a more specific paging signal sequence according to the first embodiment.
Figure 6:
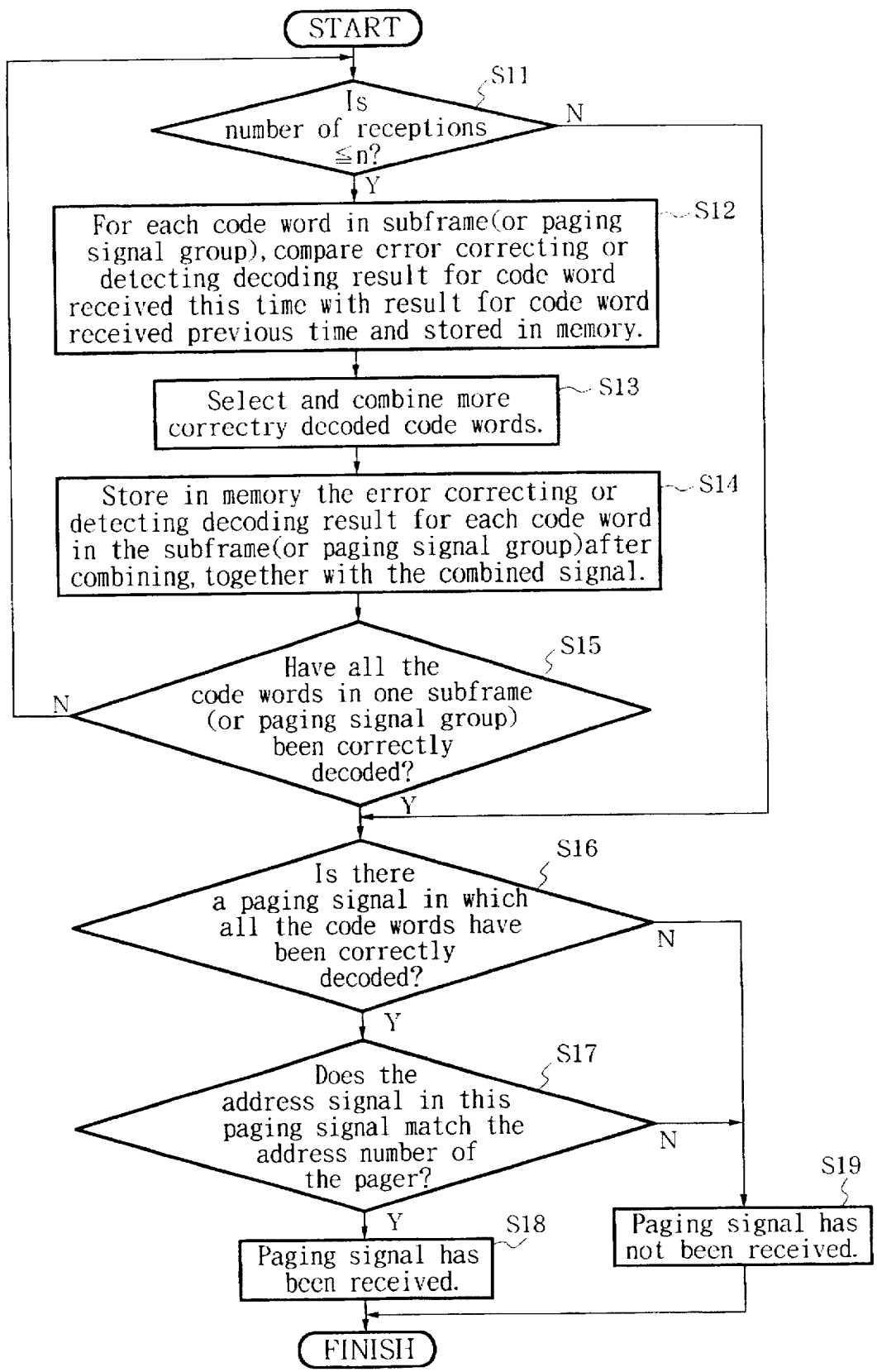
FIG. 6 is a flowchart showing the operation of the processor circuit when using the more specific paging signal sequence according to the first embodiment.
Figure 7:
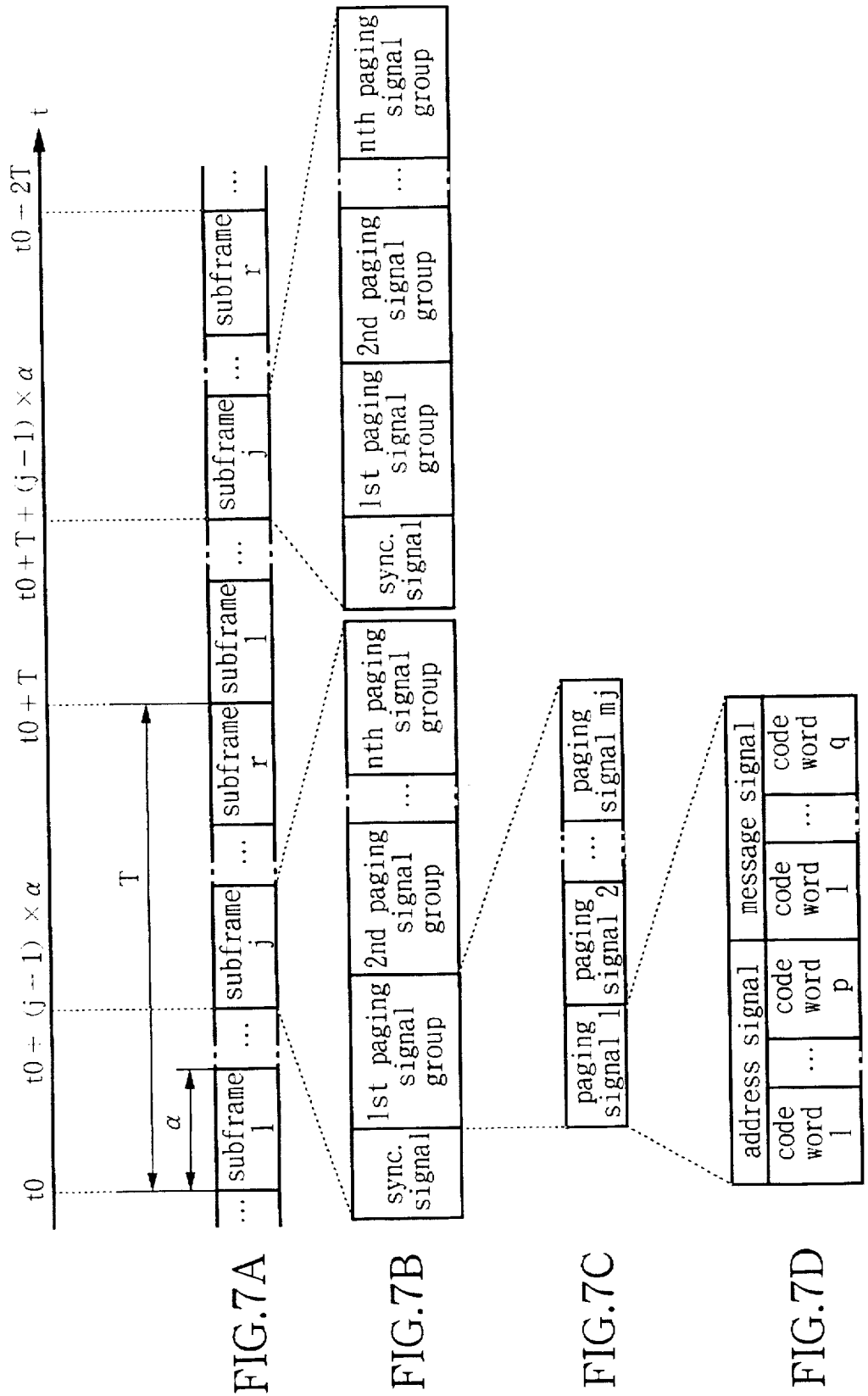
FIGS. 7A–7D illustrate a specific paging signal sequence according to a second embodiment of this invention.

Next, a more specific explanation of this first embodiment of the invention will be given with reference to FIGS. 5A–5C and FIG. 6. FIGS. 5A–5C show a more specific paging signal sequence according to the first embodiment, while FIG. 6 is a flowchart showing the operation of processor circuit 5 in respect of this more specific paging signal sequence. When a paging signal is transmitted n times, in FIGS. 5A–5C each subframe comprises paging signals transmitted the same number of times, which means that a frame comprising subframes of paging signals transmitted the same number of times is transmitted n times. The position of a retransmitted paging signal is known at pager 11.

When the number of receptions not exceed n (S11), a comparison is made, for each code word in the subframe, between the result of the error correcting or error detecting decoding of the code word received this time, and the corresponding result for the previous code word, which is stored in memory 6 (S12). Time diversity reception processing is then performed, wherein correctly decoded code words are selected and combined (S13). The error correcting or error detecting decoding results for code words after this selecting and combining are stored in memory 6 together with the signal after this combining (S14). When there are one or more code words that have not been correctly decoded in one subframe, this processing is repeated (S15). Next, when all the code words in one subframe have been correctly decoded, or when the number of receptions has reached n+1, it is decided whether or not there is a paging signal in which all the code words are correctly decoded (S16), whereupon it is decided whether or not the address signal in this paging signal matches the address number of pager 11 (S17). If it does match, the paging signal is deemed to have been received (S18), whereupon paging operations are carried out via driver 7, said paging operations being the emission of a ringing tone from speaker 9 and the display of the message signal on display 8. If it does not match, or if there is no paging signal such that all its code words have been correctly decoded, the paging signal is deemed not to have been received, and processing is terminated (S19). When all the code words in one subframe have been decoded without error, part of pager 11 can be stopped from working until the following n receptions. Alternatively, a finer degree of control may be applied so that part of pager 11 is stopped from working, in units of correctly decoded code words, until the following n receptions. In this first embodiment of the invention, the operation of receiving part 2 is stopped by a control signal from processor circuit 5.

(Second embodiment)

Next, a second embodiment of this invention will be explained with reference to FIGS. 7A-7D, which shows a specific paging signal sequence according to this second embodiment. The configuration a device according to this second embodiment of the invention can be explained in similar manner to a device according to the first embodiment. This second embodiment differs from the first embodiment with respect to the configuration of the paging signal sequence. In the paging signal sequence depicted in FIGS. 7A-7D, each frame of time length T is divided into r subframes of time length α, and these are transmitted n times in order, starting from subframe 1. Each subframe contains n paging signal groups, each of which differs in respect of the number of times it has been transmitted. This paging signal sequence is one which the present applicant has proposed in Jap. Pat. Appl. No. 5-012822. A paging signal group which is being transmitted for the nth time and which is positioned at the end of the subframe j which is transmitted at time t0+(j−1)α, is deleted from the subframe j which is transmitted at time t0+T+(j−1)α, and instead, a paging signal group which is being transmitted for the first time is inserted at the front of subframe j, said paging signal group containing new paging signals. Because new paging signals can always be inserted within the n transmissions in the paging signal group positioned at the front of a subframe, the delay time between a caller who wishes to page a given pager making his call and the pager actually paging its user can be shortened.

For example, in the case of the paging signal sequence according to the first embodiment of this invention and explained with reference to FIGS. 5A-5C, a paging request that has been newly made during the transmission of the first paging signal frame shown in FIG. 5A will be delayed until n repetitions have been completed. In other words, the maximum delay time is approximately nT, and only after this will this paging request at last be transmitted as a paging signal.

In contrast with this, in the paging signal sequence according to the second embodiment of this invention and depicted in FIGS. 7A-7D, in each of the n transmissions, new paging signals can be inserted in the first paging signal group positioned at the front of a subframe. Consequently, a paging request made for example directly after time t0 in FIG. 7A will be inserted in the first paging signal group positioned at the front of subframe 1 which is transmitted at time t0+T, which means that the maximum delay time will be T. The delay time between a caller who wishes to page a pager making his call and the pager actually paging its user can consequently be made shorter than in the first embodiment of this invention. The flowchart given in FIG. 6 can be applied to this paging signal sequence as well.

In this second embodiment of the invention as well, as was explained in connection with the first embodiment, when all the code words in one subframe have been decoded without error, part of pager 11 can be stopped from working until the following n receptions. Alternatively, a finer degree of control may be applied so that part of pager 11 is stopped from working, in units of correctly decoded code words, until the following n receptions. In this second embodiment of the invention as well, the operation of receiving part 2 is stopped by a control signal from processor circuit 5, just as in the first embodiment.

Figure 8:
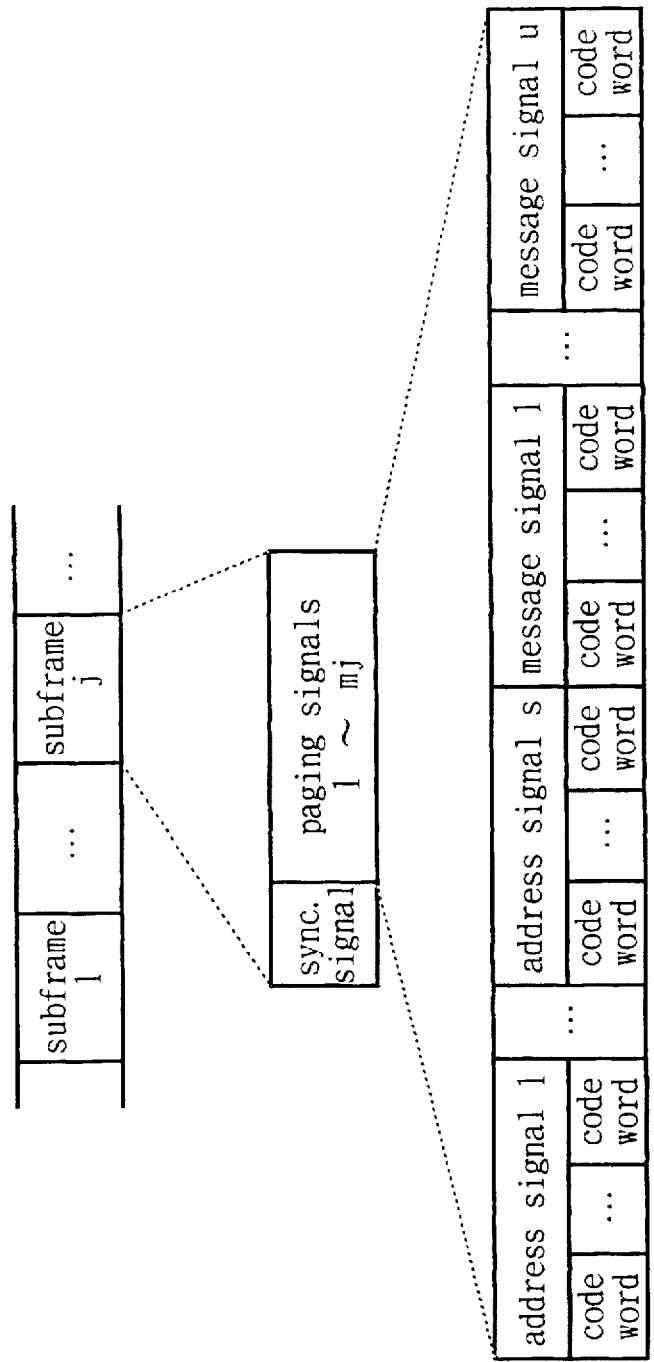
FIG. 8 shows another paging signal sequence.

In the paging signal sequence depicted in FIG. 8, the paging signals are collectively configured as two separate fields, one field being for address signals and the other for message signals. Because this invention performs time diversity reception on each code word, the address signals and message signals can be accommodated in any positions.

Because time diversity reception processing can be carried out on both the address signals and the message signals, the probability of receiving a paging signal correctly can be increased.

We claim:

1. Time diversity communication system comprising:

a radio signal transmitting device which repeatedly transmits a paging signal, wherein said paging signal includes an address signal and a message signal associated therewith, said address signal identifying a receiving device to which said message signal is directed, said address signal and said message signal each being defined by a plurality of code words such that each code word in said address signal defines a unique portion of an entire address signal and each code word in said message signal defines a unique portion of an entire message signal, said code words in said paging signal being encoded in accordance with one of an error correcting logic and an error detecting logic; and a receiving device which receives said repeated transmissions of said paging signal, said receiving device comprising:

a decoder that for each received paging signal decodes each code word in said received paging signals in accordance with one of said error correcting logic and said error detecting logic to produce (1) decoded code words and (2) error detecting results for each decoded code word, said error detecting results indicating whether an associated code word is a correctly decoded code word if said code words are encoded in accordance with said error detecting logic, and said error detecting results indicating a number of error-corrected bits for each associated code word if said code words are encoded in accordance with said error correcting logic, a memory for storing (1) said decoded code words and (2) said error detecting results for each of said decoded code words of each received paging signal;

a processor that collects each of the decoded code words based on said stored error detecting results from said received paging signals to define a correctly decoded paging signal that includes only correctly decoded code words.

2. A time diversity communication system as set forth in claim 1, wherein said processor collects from among said repeatedly transmitted paging signals decoded code words having a smallest number of error-corrected bits to define said correctly decoded paging signal if said code words are encoded in accordance with said error correcting logic.

3. A time diversity communication system as set forth in claim 1 or 2, wherein said receiving device, responsive to code words judged to have been correctly decoded in accordance with one of said error correcting and said error detecting logic have been obtained from among code words with a same content that have been received over a plurality of times, prohibits subsequent reception of said code words with a same content.

4. A time diversity communication system as set forth in claim 1 or 2, wherein:

said radio signals transmitted from said transmitting device comprise frames which are transmitted repeatedly n times, each frame containing a plurality of subframes, and each subframe containing a plurality of said paging signals; and said receiving device is a selective radio paging receiver which receives said radio signals and detects if an address signal matches an address assigned to said receiving device.

5. A time diversity communication system as set forth in claim 1 or 2, wherein said radio signals transmitted from said transmitting device comprise frames which are transmitted n times, each frame containing a plurality of subframes of equal time length, and each subframe containing n paging signal groups each of which differs in respect to a number of times it has been transmitted; and a paging signal group which was transmitted for an nth time in a subframe that was transmitted in the previous transmission period is deleted from said subframe that is transmitted in the present transmission period, and instead, a paging signal group which is being transmitted for a first time and which contains new paging signals is inserted in that subframe.

6. A time diversity communication system as set forth in claim 5, wherein:

each of said plurality of paging signal groups contains a plurality of said paging signals; and said receiving device is a selective radio paging receiver which receives said radio signals and detects if said address signal matches an address assigned to said receiving device.

\* \* \* \* \*

UNITED STATES PATENT AND TRADEMARK OFFICE
CERTIFICATE OF CORRECTION

PATENT NO. : 5,794,124
DATED : August 11, 1998
INVENTOR(S) : ITO, et al

It is certified that error appears in the above-identified patent and that said Letters Patent is hereby corrected as shown below:

On the title page, item [63], insert the following:

Continuation of international application number PCT/JP95/00395, filed March 10, 1995, abandoned.--

Signed and Sealed this

Twenty-ninth Day of June, 1999

*Attest:*

*Attesting Officer*

Q. TODD DICKINSON

*Acting Commissioner of Patents and Trademarks*